(12) United States Patent
Li et al.

(10) Patent No.: US 12,711,994 B2
(45) Date of Patent: Aug. 18, 2026

(54) VIDEO GENERATING METHOD AND APPARATUS, DEVICE, AND MEDIUM

(71) Applicant: Beijing Zitiao Network Technology Co., Ltd., Beijing (CN)

(72) Inventors: Xiaofeng Li, Beijing (CN); Lu Lu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 82 days.

(21) Appl. No.: 18/012,203

(22) PCT Filed: Jan. 26, 2022

(86) PCT No.: PCT/CN2022/073932

§ 371 (c)(1),
(2) Date: Dec. 21, 2022

(87) PCT Pub. No.: WO2022/170975

PCT Pub. Date: Aug. 18, 2022

(65) Prior Publication Data

US 2023/0282241 A1 Sep. 7, 2023

(30) Foreign Application Priority Data

Feb. 10, 2021 (CN) ......................... 202110185457.4

(51) Int. Cl.
*G11B 27/031* (2006.01)
*G06T 3/60* (2006.01)

(52) U.S. Cl.
CPC ............. *G11B 27/031* (2013.01); *G06T 3/60* (2013.01)

(58) Field of Classification Search
CPC ................................ G11B 27/031; G06T 3/60
See application file for complete search history.

(56) References Cited

U.S. PATENT DOCUMENTS 7,116,341 B2 * 10/2006 Ohto ....................... G06T 13/20 345/949
2003/0218617 A1 11/2003 Ohto
2015/0155006 A1 * 6/2015 Chou .................. G11B 27/031 386/230

(Continued)

FOREIGN PATENT DOCUMENTS

CN 105096241 A 11/2015
CN 107807836 A 3/2018

(Continued)

OTHER PUBLICATIONS

International Search Report and Written Opinion issued in International Application No. PCT/CN2022/073932 on Mar. 31, 2022.

(Continued)

*Primary Examiner* — Sunghyoun Park
(74) *Attorney, Agent, or Firm* — Astute IP Law Group

(57) ABSTRACT

A video generating method and apparatus, a device, and a medium are provided. The video generating method comprises: obtaining an image of a target object; and generating a target video according to the image of the target object, wherein the target video is a video comprising a swinging target part, and the target part is a part comprised in the target object.

14 Claims, 5 Drawing Sheets

S110

Acquire an image of a target object

S120

Generate a target video based on the image of the target object, where the target video is a video including a swinging target part, and the target part is a part of the target object

(56) References Cited

U.S. PATENT DOCUMENTS

| | | | | |
|---|---|---|---|---|
| 2015/0379754 | A1* | 12/2015 | Okaniwa | G06T 13/40 345/474 |
| 2016/0027202 | A1 | 1/2016 | Sudheendra et al. | |
| 2016/0260204 | A1* | 9/2016 | Yu | G06T 5/77 |
| 2017/0244931 | A1 | 8/2017 | Faulkner | |
| 2017/0287060 | A1* | 10/2017 | Choi | G06T 15/04 |
| 2018/0204372 | A1 | 7/2018 | Sudheendra et al. | |
| 2021/0029305 | A1 | 1/2021 | Tang et al. | |
| 2021/0065406 | A1 | 3/2021 | Wu et al. | |

FOREIGN PATENT DOCUMENTS

| | | | |
|---|---|---|---|
| CN | 107909636 | A | 4/2018 |
| CN | 108702484 | A | 10/2018 |
| CN | 108882025 | A | 11/2018 |
| CN | 108921795 | A | 11/2018 |
| CN | 109618183 | A | 4/2019 |
| CN | 109729284 | A | 5/2019 |
| CN | 110099300 | A | 8/2019 |
| CN | 111277893 | A | 6/2020 |
| CN | 111429338 | A | 7/2020 |
| CN | 111432267 | A | 7/2020 |
| CN | 111507890 | A | 8/2020 |
| CN | 111968206 | A | 11/2020 |
| CN | 112887796 | A | 6/2021 |
| KR | 1020050094217 | A | 9/2005 |

OTHER PUBLICATIONS

"How to make a bobblehead animation picture", https://jingyan.baidu.com/article/5225f26bba540066fa0908dd.html, Nov. 25, 2017, pp. 1-5.

Extended European Search Report in European Patent Application No. 22752136.6, mailed Apr. 2, 2024.

Xiaolin, "It is Very Easy to Make Beautiful Pictures by Cutting out Pictures", Computer Fan, Dec. 31, 2010, Issue 6, 2 pages.

Notification to Grant Patent Right for Invention for Chinese Patent Application No. 202110185457.4, mailed on Jun. 22, 2022, 6 pages.

* cited by examiner

VIDEO GENERATING METHOD AND APPARATUS, DEVICE, AND MEDIUM

The present disclosure PCT/CN2022/073932 titled "VIDEO GENERATING METHOD AND APPARATUS, DEVICE, AND MEDIUM", filed on Jan. 26, 2022, which claims the priority of a Chinese Patent Application No. 202110185457.4, titled "VIDEO GENERATING METHOD AND APPARATUS, DEVICE, AND MEDIUM", filed with the China National Intellectual Property Administration on Feb. 10, 2021, both of which are incorporated herein by reference in their entireties.

TECHNICAL FIELD

The present disclosure relates to the field of multimedia technology, in particular to a video generation method and apparatus, a device, and a medium.

BACKGROUND

With the rapid development of computer technology and mobile communication technology, various video platforms based on electronic devices have been widely used, greatly enriching people's daily life. More and more users are willing to share their video works on the video platforms for other users to watch.

When producing a video, users first need to perform some slightly complex material editing operations on materials, and then perform a series of complex video editing operations on the edited materials to finally generate a video work. In a case that the users are not good at material editing and video editing, the time cost of video production will be high, and the quality of the video works cannot be guaranteed, lowering the user experience.

SUMMARY OF THE INVENTION

In order to solve the above technical problem or at least partially solve the above technical problem, a video generation method and apparatus, a device, and a medium are provided according to the present disclosure.

In a first aspect, a video generation method is provided in the embodiment of the present disclosure. The video generation method includes:

acquiring an image of a target object; and generating a target video based on the image of the target object, where the target video is a video including a swinging target part, and the target part is a part of the target object.

In a second aspect, a video generation apparatus is provided in the embodiment of the present disclosure. The video generation apparatus includes:

an acquisition unit configured to acquire an image of a target object; and a generating unit configured to generate a target video based on the image of the target object, where the target video is a video including a swinging target part, and the target part is a part of the target object.

In a third aspect, a video generation device is provided in the embodiment of the present disclosure. The video generation device includes:

a processor;

a memory for storing executable instructions;

where the processor is configured to read the executable instructions from the memory and execute the executable instructions to perform the video generation method according to the first aspect.

In a fourth aspect, a computer-readable storage medium storing a computer program thereon is provided in the embodiment of the present disclosure. The computer program, when executed by a processor, causes the processor to perform the video generation method according to the first aspect.

Compared with the conventional technology, the technical solution provided in the embodiments of the present disclosure has the following advantages.

With the video generation method and apparatus, device and medium according to the embodiments of the present disclosure, after the image of the target object is acquired, the target video including the swinging target part can be directly generated. The target part is a part of the target object. Therefore, the material editing and video editing are automatically performed, so as to automatically generate the target video including the swinging target part using the image of the target part, without manual material editing and video editing by users, thereby reducing the time cost of video production, improving the quality of video works, to improve the user experience.

BRIEF DESCRIPTION OF THE DRAWINGS

The above and other features, advantages and aspects of the embodiments of the present disclosure will be more apparent in conjunction with the drawings and with reference to the following embodiments. The same or similar reference numerals throughout the drawings represent the same or similar elements. It should be understood that the drawings are schematic and the components and elements are unnecessarily drawn to scale.

DETAILED DESCRIPTION OF THE EMBODIMENTS

Figure 1:
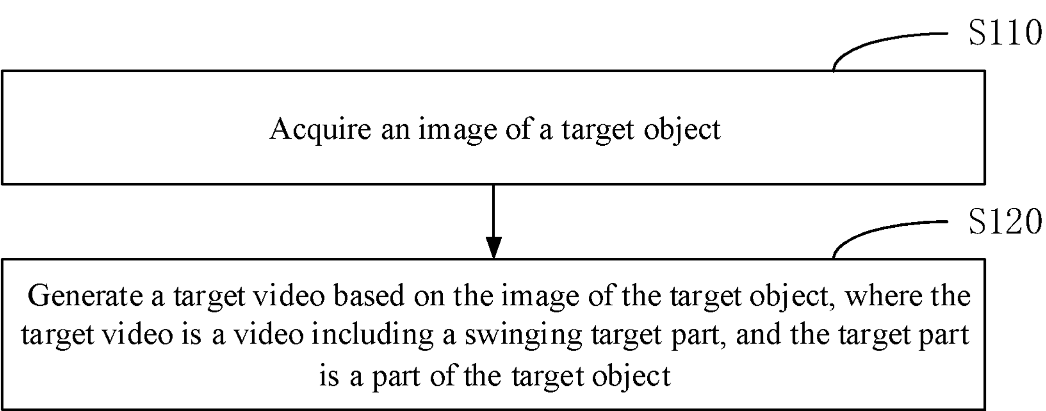
FIG. 1 is a schematic flowchart of a video generation method according to an embodiment of the present disclosure.

Embodiments of the present disclosure are described in detail below with reference to the drawings. Although some embodiments of the present disclosure are shown in the drawings, it should be understood that embodiments of the present disclosure may be implemented in various forms and should not be limited to the embodiments. The embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiment of the present disclosure may be performed in different orders and/or in parallel. In addition, the method embodiment may include an additional step and/or an omitted step that is not shown herein. The scope of embodiments of the present disclosure is not limited in this aspect.

The term "include" and its variations in the present disclosure means open-ended inclusion, that is, "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the concepts such as "first" and "second" mentioned in the present disclosure are used to distinguish different devices, modules or units, and are not used to limit an sequential order or interdependence of the functions performed by the devices, modules or units.

It should be noted that the modifications such as "one" and "multiple" mentioned in the embodiments of the present disclosure are illustrative and not restrictive. Those skilled in the art should understand that the modifications should be understood as "one or more" unless otherwise expressly indicated in the context.

Names of messages or information exchanged between multiple apparatuses in the embodiments of the present disclosure are only for illustrative purposes, and are not intended to limit the scope of the messages or information.

A video generation method and apparatus, a device and a medium capable of automatically performing material editing and video editing on the video material are provided according to the embodiments of the present disclosure.

A video generation method according to an embodiment of the present disclosure will be described below with reference to FIG. 1.

In some embodiments of the present disclosure, the video generation method may be performed by an electronic device. The electronic device may include a device with communication function such as a mobile phone, a tablet computer, a desktop computer, a notebook computer, an in-vehicle terminal, a wearable electronic device, an all-in-one machine, and a smart home device, or may be a device simulated with a virtual machine or an emulator.

FIG. 1 shows a schematic flowchart of a video generation method according to an embodiment of the present disclosure.

As shown in FIG. 1, the video generation method may include the following steps.

In S110, an image of a target object is acquired.

In the embodiment of the present disclosure, when a user wants to create a video, the image of the target object may be acquired by an electronic device.

In the embodiment of the present disclosure, the target object may be preset according to actual needs, and is not limited here.

Optionally, the target object may be at least one of a person and an animal.

Taking the target object being a person as an example, the image of the target object may be the image of the person.

In some embodiments of the present disclosure, the image of the target object may be a real-time image captured by the electronic device in real time.

Specifically, the user may control the electronic device to enter an image capture mode, control the electronic device to capture the real-time image when the electronic device is in the image capture mode, and take the real-time image as the image of the target object.

In other embodiments of the present disclosure, the image of the target object may also be a local image stored in the electronic device.

Specifically, the user may control the electronic device to enter an image selection mode, select a local image displayed by the electronic device when the electronic device is in the image selection mode, and take the local image selected by the user as the image of the target object.

In S120, a target video is generated based on the image of the target object. The target video is a video including a swinging target part. The target part is a part of the target object.

In the embodiment of the present disclosure, the target part may be any part of the target object preset according to actual needs, and is no limited here.

In some embodiments, the target part may be any part of the target object classified according to a first granularity. For example, the target part may be a head, a trunk, an upper limb, a lower limb, etc. of the person or animal.

In other embodiments, the target part may be any part of the target object classified according to a second granularity finer than the first granularity. For example, the target part may be a face, a hand, feet, etc. of the person and animal.

In still other embodiments, the target part may be any part of the target object classified according to a granularity different from the first granularity and the second granularity, and is not limited here.

In the embodiment of the present disclosure, after the electronic device acquires the image of the target object, a target video, in which the target part of the target object swings back and forth, may be generated based on the image of the target object.

Optionally, S120 may specifically include: acquiring the image of the target part based on the image of the target object; generating the target video based on the image of the target part.

Specifically, the electronic device may first extract an image area where the target part is located from the image of the target object using a preset target part recognition algorithm, take the image area where the target part is located as the image of the target part, and then generate the target video with the target part swinging back and forth, based on the image of the target part.

In the embodiment of the present disclosure, after acquiring the image of the target object, the target video including the swinging target part may be directly generated. The target part is a part included in the target object. Therefore, it is possible to realize automatic editing on the material and automatic editing on the video, so as to automatically generate the target video including the swinging target part using the image of the target part, without manually editing materials and editing videos by the user, thereby reducing the time cost of video production, improving the quality of video works, to improve the user experience.

In another embodiment of the present disclosure, in order to bring more fun to the generated video, the electronic device may generate the target video using the image of the target part based on the following method.

In some embodiments of the present disclosure, generating the target video based on the image of the target part may specifically include: directly generating the target video including the target part swinging back and forth, by using an original image of the target part extracted from the image of the target object, where the target video includes the feature of the target part in the original image.

In other embodiments of the present disclosure, generating the target video based on the image of the target part may specifically include: fusing the image of the target part with a style image of the target part to obtain a fused image of the target part; generating the target video based on the fused image of the target part. That is, the electronic device may extract the original image of the target part from the image of the target object, and then perform stylization on the original image of the target part, and generate the target video based on the image of the target part undergone the stylization (that is, the fused image of the target part).

The term "style image" used herein may include a stylized image subjected to processing such as style generation or style transfer, an image with a specified style or an image presented in a specified style. For example, in an embodiment of the present disclosure, the style image of the target part is a stylized image of the target part, which is generated by Generative Adversarial Networks (GAN) based on the image of the target part. For another example, in the embodiment of the present disclosure, the style image of the target part may be a standard image of the target part with a specified style, which may be preset according to actual needs, and is not limited here.

Taking the target part being the head as an example, the style image of the target part may be a standard head image of a comic character.

Taking the target part being the face as an example, the style image of the target part may be a standard face image of a New Year's painting doll.

Specifically, after acquiring the original image of the target part, the electronic device may fuse the original image of the target part with the style image of the target part using a preset image fusion algorithm to obtain the fused image of the target part with the specified style. The fused image of the target part not only has the feature of the target part in the original image, but also has a style feature in the style image of the target part, so as to obtain the stylization effect of the target part.

Therefore, in the embodiment of the present disclosure, the electronic device may generate, by using the fused image of the target part, the target video including the target part swing back and forth, where the target part in the target video has both the feature of the target part in the original image of the target part and the style feature in the style image of the target part.

In some embodiments, generating the target video based on the fused image of the target part may specifically include: deforming the fused image of the target part to obtain a deformed fused image of the target part; generating the target video based on the deformed fused image of the target part.

Specifically, after obtaining the fused image of the target part, the electronic device may deform a deformation object in the fused image of the target part with a deformation method corresponding to the style image, to obtain the deformed fused image of the target part, and then generate the target video based on the deformed fused image of the target part.

Optionally, the deformation method may be preset according to the actual needs, through which the target part may be further highlighted with the style corresponding to the style image of the target part, and is not limited here.

Optionally, the deformation object may be preset according to the actual needs, through which the target part may be further highlighted with the style corresponding to the style image of the target part, and is not limited here.

Taking the case of the target part being the face and the style image of the target part being an image of New Year's painting doll as an example, the deformation object may include eyes, and the deformation method may include enlarging the eyes at a preset scale. Alternatively, the deformation object may include a mouth, and the deformation method may include narrowing the mouth in a preset scale. The deformation object and deformation method may vary, as long as the face may be further highlighted with the style of New Year's painting doll, corresponding to the image of the New Year's painting doll.

Therefore, in the embodiment of the present disclosure, the electronic device may generate the target video including the target part swinging back and forth, by using the deformed fused image of the target part, further enhancing the stylization effect of the target video.

In other embodiments, generating the target video based on the fused image of the target part may specifically include: synthesizing the fused image of the target part with the style image of a target body-part to obtain a target composite image; generating the target video based on the target composite image.

Specifically, after acquiring the fused image of the target part, the electronic device may superimpose the fused image of the target part onto a target area in the style image of the target body-part to synthesize the fused image of the target part with the style image of the target body-part, so as to obtain the target composite image, and then generate the target video based on the target composite image. The target area in the style image of the target body-part corresponds to the target part. For example, in the case that the target part is the face and the target body-part is the head, the target area may be the face area in the style image of the head. In addition to the face area, the style image of the head may further include a hair area, an area of head accessories (such as a hat, headdress) and the like.

Optionally, the target body-part may be a body-part of the target object which is classified according to a third granularity and includes the target part.

The fineness of the third granularity is lower than that of the granularity according to which the target part is classified.

In a case that the target part is the face, hand, foot, etc. of the person or animal, the target body-part may accordingly be the head, trunk, upper limb, lower limb, etc. of the person or animal.

Taking the target part being the face as an example, the target body-part may be the head.

In the embodiment of the present disclosure, the style image of the target body-part may be a preset style standard image of the target body-part with a style corresponding to the style image of the target part, and is not limited here.

Taking the case of the target part being the face, the target body-part being the head, and the style image of the target part being the standard face image of the New Year's painting doll as an example, the style standard image of the target body-part may be the standard head image of the New Year's painting doll, so that the style image of the target part and the style image of the target body may have the same style, thereby ensuring the style consistency of the target body-part in the target composite image.

In an example, the electronic device may splice the fused image of the target part into the target area in the style image of the independent target body-part to obtain the target composite image. The target area in the style image of the target body-part corresponds to the target part. For example, in the case that the target part is the face and the target body-part is the head, the target area may be the face area in the style image of the head. In addition to the face area, the style image of the head may further include a hair area, an area of head accessories (such as a hat, headdress) and the like.

Further, taking the case of the target part being the face, the target body-part being the head, the style image of the target part being the standard face image of the New Year's painting doll, and the style image of the target body-part being the standard head image of the New Year's painting doll as an example, the electronic device may fuse the original face image with the standard face image of the New Year's painting doll to obtain the fused image of the face, and then splice the fused image of the face to the face area of the standard head image of the New Year's painting doll to obtain the target composite image.

In another example, the style image of the target body-part may be a part of a target template image. The electronic device may splice the fused image of the target part into an image area for placing the target part in the target template image, to obtain a template composite image, and then cut the target body-part out from the template composite image, to obtain the target composite image.

Further, taking the case of the target part being the face, the target body-part being the head, the style image of the target part being the standard face image of the New Year's painting doll, the style image of the target body-part being the standard head image of the New Year's painting doll, and the standard head image of the New Year's painting doll being a part of the template image of the New Year's painting doll as an example, the electronic device may fuse the original face image with the standard face image of the New Year's painting doll, to obtain the fused image of face; splice the fused image of the face to the face area in the standard head image of the New Year's painting doll in the template image of the New Year's painting doll, to obtain a template composite image of the New Year's painting doll; and then cut the head out of the template composite image of the New Year's painting doll (extract the complete head image) to obtain the target composite image.

Therefore, in the embodiment of the present disclosure, the electronic device may generate the target video including the target part swinging back and forth, by using the target composite image synthesized from the fused image of the target part and the style image of the target body, further enhancing the stylization effect of the target video.

In yet other embodiments, generating the target video based on the fused image of the target part may specifically include: deforming the fused image of the target part to obtain the deformed fused image of the target part; synthesize the deformed fused image of the target part and the style image of the target body-part, to obtain the target composite image; generating the target video based on the target composite image.

Taking the case of the target part being the face, the target body-part being the head, and the style image of the target part being the standard face image of the New Year's painting doll, and the style image of the target body-part being the standard head image of the New Year's painting doll as an example, the electronic device may fuse the original face image with the standard face image of the New Year's painting doll to obtain the fused face image; enlarge the eyes in the fused face image at the preset ratio, to obtain the fused face image with enlarged eyes; and splice the fused face image with enlarged eyes to the face area in the standard head image of the New Year's painting doll, to obtain the target composite image.

Therefore, in the embodiment of the present disclosure, the electronic device may generate the target video including the target part swinging back and forth, using the target composite image synthesized from the deformed fused image of the target part and the style image of the target body-part, further enhancing the stylization effect of the target video.

In still another embodiment of the present disclosure, after the target video is generated, the target video may be displayed to show the target part swinging back and forth.

In still another embodiment of the present disclosure, in order to improve the swing effect of the target part and improve the user experience, in the target video, the target part may have a swing angle corresponding to a respective timestamp of the target video. The swing angle may be determined based on the timestamp and a trigonometric function motion curve. The trigonometric function motion curve may be generated based on preset swing parameters.

The swing parameters may include a swing direction, a maximum swing angle in the swing direction, and a swing speed in the swing direction.

The swing direction may be the direction of a swing surface of the target part. The swing direction may be preset according to the actual needs, and is not limited here.

For example, the swing direction may include the direction parallel to the plane of the image, that is, the swing plane of the target part is parallel to the plane of the image. For another example, the swing direction may include the direction perpendicular to the plane of the image, that is, the swing surface of the target part is perpendicular to the plane of the image.

The maximum swing angle in the swing direction may be preset according to actual needs, and is not limited here.

For example, the maximum swing angle in the swing direction may be 10°, 30° or 45°.

The swing speed in the swing direction may be preset according to actual needs, and is not limited here.

For example, the maximum swing speed in the swing direction may be 10°/S.

It can be seen that the trigonometric function motion curve generated based on the swing parameters may be used to calculate the swing angles of the target video corresponding to respective timestamps of the target video during the swing of the target part at the specified swing speed, in the swing direction and by maximum swing angle.

Therefore, in the embodiment of the present disclosure, by obtaining the swing angle of the target part at every timestamp of the target video based on the trigonometric function motion curve, the target part can swing back and forth based on the trigonometric function motion curve, so that the swing process is natural and simple, and thus the aesthetics of the target video is improved.

Optionally, the swing angle of the target part at every timestamp of the target video may be predetermined by a server. In the embodiment of the present disclosure, before generating the target video based on the image of the target object, the video generation method may further include acquiring the swing angles corresponding to respective timestamps.

Specifically, the server may generate the trigonometric function motion curve based on the preset swing parameters, and input each timestamp into the trigonometric function motion curve to obtain the swing angle corresponding to the timestamp. The electronic device may obtain the swing angles corresponding to respective timestamps from the server.

Optionally, the swing angles of the target part corresponding to respective timestamps of the target video may be determined by the electronic device. Specifically, before the electronic device generates the target video based on the image of the target object, the server may generate the trigonometric function motion curve based on the preset swing parameters. The electronic device may obtain the trigonometric function motion curve from the server, and input each timestamp into the trigonometric function motion curve to obtain the swing angle corresponding to the timestamp.

Optionally, the swing angles of the target part corresponding to respective timestamps of the target video may be determined by the electronic device. In the embodiment of the present disclosure, before generating the target video based on the image of the target object, the video generation method may further include the step of determining swing angles corresponding to respective timestamps. The step of determining swing angles corresponding to respective timestamps may include: generating the triangular function motion curve based on the swing parameters; determining swing angles corresponding to respective timestamps based on the trigonometric function motion curve.

The step of determining swing angles corresponding to respective timestamps may be performed before acquiring the image of the target object, or after acquiring the image of the target object and before generating the target video based on the image of the target object, which is not limited here.

The step of determining swing angles corresponding to respective timestamps will be described below with reference to FIG. 2.

Figure 2:
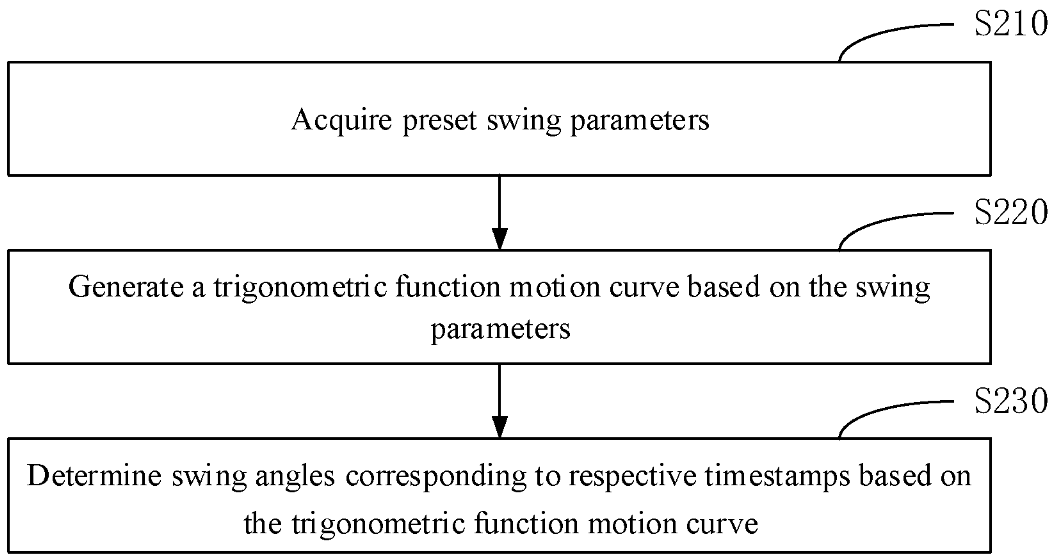
FIG. 2 is a schematic flowchart of a swing angle determination method according to an embodiment of the present disclosure.

FIG. 2 shows a schematic flowchart of a swing angle determination method according to an embodiment of the present disclosure.

As shown in FIG. 2, the swing angle determination method may include the following steps.

In S210, preset swing parameters are acquired.

In the embodiment of the present disclosure, the electronic device may acquire the swing parameters for generating a trigonometric function motion curve.

In some embodiments of the present disclosure, the preset swing parameters may be swing parameters preset according to actual needs, which are acquired from a server.

In other embodiments of the present disclosure, the preset swing parameters may be the swing parameters inputted by users to the electronic device.

In S220, a trigonometric function motion curve is generated based on the swing parameters.

In the embodiment of the present disclosure, after acquiring the swing parameters, the electronic device may input the swing parameters into a preset curve equation based on trigonometric function, to obtain a trigonometric function motion curve in the specified swing direction.

The preset curve equation based on trigonometric function may be:

$$\text{Swing angle}=\text{maximum swing angle}\times\text{Sin}((\text{timestamp}-0)\times\text{Swing speed}).$$

In S230, swing angles corresponding to respective timestamps are determined based on the trigonometric function motion curve.

In the embodiment of the present disclosure, after acquiring the trigonometric function motion curve in the specified swing direction, the electronic device may input each timestamp into the trigonometric function motion curve, to obtain swing angles corresponding to respective timestamps in the specified swing direction.

Therefore, in the embodiment of the present disclosure, the swing angles of the target part corresponding to respective timestamps of the target video may be simply and quickly determined based on the trigonometric function motion curve, so that the target part may swing back and forth based on the trigonometric function motion curve. The swing process is natural and simple, and thus the aesthetics of the target video is improved.

Returning to FIG. 1, in some embodiments of the present disclosure, generating the target video based on the image of the target part may specifically include:

- rotating the image of the target part at the swing angles corresponding to respective timestamps to obtain rotated images of the target part corresponding to respective timestamps;
- generating the target video based on the rotated images of the target part corresponding to respective timestamps.

Specifically, after acquiring the image of the target part, the electronic device may rotate the image of the target part at the determined swing angles to obtain the rotated images of the target part corresponding to respective timestamps, and then generate the target video based on the rotated images of the target part corresponding to respective timestamps.

Optionally, rotating the image of the target part at the swing angles corresponding to respective timestamps to obtain rotated images of the target part corresponding to respective timestamps may specifically include:

- for each swing angle, acquiring a rotation matrix corresponding to the swing angle; and
- performing image conversion on the image of the target part based on the rotation matrix corresponding to the swing angle by taking a target pixel of the image of the target part as an image origin, to obtain the rotated image of the target part corresponding to the timestamp for the swing angle.

The target pixel may be any pixel in the image of the target part pre-selected according to actual needs, and is not limited here.

Taking the case of the target part being the face as an example, the target pixel may be a pixel of a chin feature point among face feature points. The electronic device may perform image conversion on the image of the target part based on the rotation matrix corresponding to the swing angle by taking the pixel of the chin feature point as a swing center, to obtain the rotated image of the target part corresponding to the timestamp for the swing angle.

In a case that the swing angles corresponding to respective timestamps are predetermined by the server, the rotation matrixes corresponding to the swing angles are also predetermined by the server. The server may pre-construct the rotation matrixes corresponding to the swing angles, and send the constructed rotation matrixes to the electronic device. For any timestamp, the electronic device may select, from the rotation matrixes sent by the server, the rotation matrix corresponding to the swing angle of the target part under the timestamp, and perform image conversion on the image of the target part based on the rotation matrix by taking the target pixel as the image origin, to obtain the rotated image of the target part with the swing angle corresponding to the timestamp.

In a case that the swing angles for respective timestamps are determined by the electronic device, for any swing angle, the electronic device may generate a corresponding rotation matrix based on the swing angle, and perform image conversion on the image of the target part based on the obtained rotation matrix by taking the target pixel as the image origin, to obtain the rotated image of the target part with the swing angle.

In a case that the swing direction is the direction parallel to the plane of the image, the electronic device may generate the rotation matrix in the direction parallel to the plane of the image based on the swing angle. The electronic device may rotate the image of the target part based on the rotation matrix to obtain the rotated image of the target part in the direction parallel to the plane of the image.

In a case that the swing direction is the direction perpendicular to the plane of the image, the electronic device may generate the rotation matrix in the direction perpendicular to the plane of the image based on the swing angle. The electronic device may rotate the image of the target part based on the rotation matrix to obtain the rotated image of the target part in the direction perpendicular to the plane of the image.

In a case that the swing direction is the direction at a preset angle with the plane of the image, the electronic device may first generate a first included angle in the direction parallel to the plane of the image and a second included angle in the direction perpendicular to the plane of the image based on the swing angle in the swing direction, and then generate, based on the first included angle and the second included angle, the rotation matrix in the direction at the preset angle with the plane of the image. The electronic device may rotate the image of the target part based on the rotation matrix to obtain the rotated image of the target part in the direction at the preset angle with the plane of the image.

It should be noted that the method of rotating the fused image of the target part, the deformed fused image of the target part and the target composite image and the method of generating the target video based on the rotated fused image of the target part, the rotated deformed fused image of the target part and the rotated target composite image are similar to the method of rotating the image of the target part and the method of generating the target video based on the rotated image of the target part, which is not repeated here.

Therefore, in the embodiment of the present disclosure, the image of the target part may be reliably rotated through the rotation matrix generated based on the swing angle to ensure that the swing process of the target part in the target video is natural.

In another embodiment of the present disclosure, the target video may be a video including the target part that swings on a target background image. The target video may be generated based on the image of the target part and the target background image.

Optionally, generating the target video based on the rotated images of the target part corresponding to respective timestamps may specifically include:

superposing the rotated images of the target part onto a target background image to obtain image frames corresponding to respective timestamps, where the target pixel in each rotated image of target part is at a target pixel position in the target background image;

generating the target video based on the image frames and the respective timestamps corresponding to the image frames.

Specifically, after acquiring the rotated images of the target part corresponding to respective timestamps, for a rotated image of the target part corresponding to a timestamp, the electronic device may superimpose the rotated image of the target part corresponding to the timestamp onto the target background image in a way of positioning the target pixel in the rotated image of the target part at the target pixel position in the target background image, to obtain the image frame corresponding to the timestamp; and sort, based on the image frames and the respective timestamps, the image frames in chronological order of the timestamps to generate the target video.

The target pixel in the rotated image of the target part is the same as the target pixel in the image of the target part.

Taking the case of the target part being the face, the target pixel in the image of the target part being the pixel of the chin feature point among face feature points of the image of the target part as an example, the target pixel in the rotated image of the target part is the pixel of the chin feature point among face feature points of the rotated image of the target part.

In some embodiments, the target background image may be a preset general background image. The target pixel position in the target background image may be the pixel position preset according to actual needs, and is not limited here.

In these embodiments, the electronic device may directly locate the target pixel in the rotated image of the target part at the target pixel position in the general background image, and then splice the rotated image of the target part with the general background image, to obtain an image frame.

Further, in these embodiments, the method of generating the image frame based on the fused image of the target part, the deformed fused image of the target part, and the target composite image is similar to the method of generating the image frame based on the image of the target part, which is not repeated here.

In other embodiments, in the process of generating the image frame based on the target composite image, the target background image may be a part of a target template image including a style image of the target body-part. Specifically, the target background image may be the part of the template composite image except the target composite image of the target body.

In these embodiments, optionally, the target pixel position in the target background image may be the position in the template composite image where the target pixel in the image of target part is located.

Since the target background image is the part of the template composite image except the target composite image of the target body, a black hollow area may appear in the image frame obtained by locating the target pixel in the rotated target composite image at the target pixel position in the target background image and splicing the rotated image of the target part with the general background image. Therefore, background completion of the image frame is also required.

Specifically, a layer of preset general base may be superimposed on a bottom layer of the image frame, so that a pattern in the general base may be displayed in the hollow area of the image frame to complement the missing background.

Therefore, in the embodiment of the present disclosure, a target video including a target part that swings on a specified background image may be generated, thereby further improving the interest and aesthetics of the target video.

To sum up, in the embodiment of the present disclosure, the original image of the target part is stylized and deformed to obtain the image of the target part with a specified style. Swing processing is then performed on the image of the target part based on the trigonometric function motion curve to obtain the target video in which the target part swings. The target part in the target video has the specified stylization effect and the swing process is aesthetically pleasing.

In order to facilitate understanding of the video generation method according to the embodiment of the present disclosure, the description will be made below with reference to FIG. 3.

Figure 3:
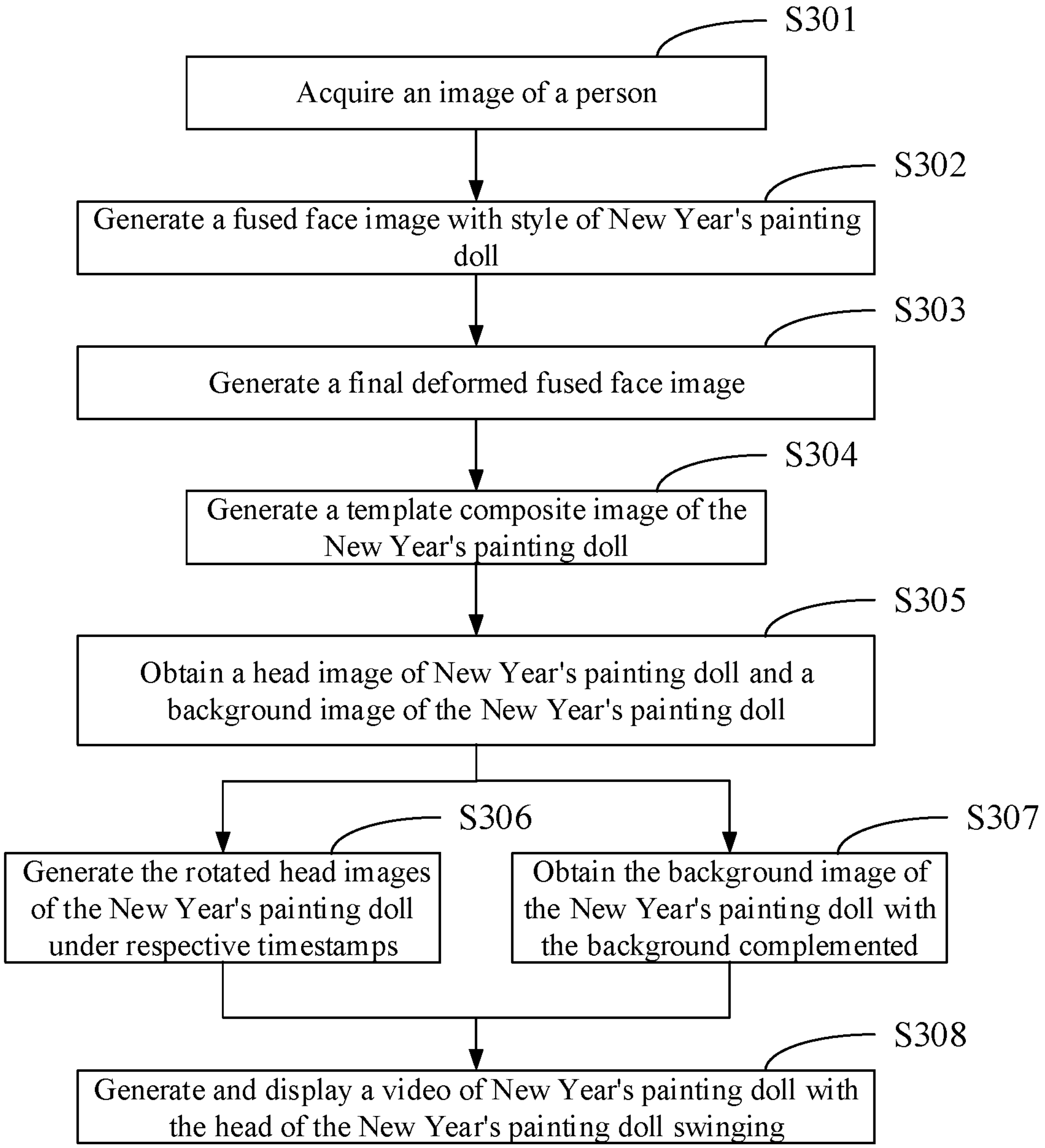
FIG. 3 is a schematic flowchart of a video generation method according to another embodiment of the present disclosure.

FIG. 3 shows a schematic flowchart of a video generation method according to another embodiment of the present disclosure.

As shown in FIG. 3, the video generation method may include the following steps.

In S301, an image of a person is acquired.

In some embodiments, the image of the person may be a real-time image captured by a user.

Figure 4:
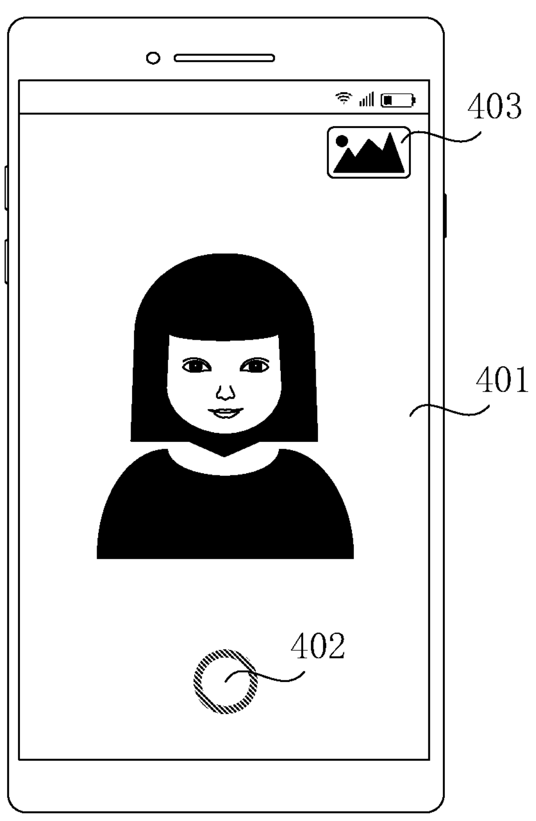
FIG. 4 is a schematic diagram showing an image capture interface according to an embodiment of the present disclosure.

FIG. 4 shows a schematic diagram of an image capture interface according to an embodiment of the present disclosure.

As shown in FIG. 4, when the electronic device is in an image capture mode, the electronic device may include a preview interface 401 and a capture-trigger button 402. The electronic device may acquire the real-time image acquired by the camera in real time, and display the real-time image in the preview interface 401. After a satisfactory real-time image is displayed in the preview interface 401, the user may click the capture-trigger button 402 to trigger the electronic device to acquire the real-time image displayed in the preview interface 401.

In other embodiments, the image of the person may be a local image selected by the user.

Continuing with reference to FIG. 4, the electronic device may further include an image selection button 403. The user may click the image selection button 403 to enter a local album of the electronic device and select a local image in the local album.

In S302, the image of the person is fused with a standard face image of New Year's painting doll to generate a fused face image with the style of the New Year's painting doll.

In S303, the fused face image is deformed, for example, eyes are enlarged and the mouth is narrowed, to generate a final deformed fused face image.

In S304, the final fused face image is spliced to an image area for placing the face in a template image of the New Year's painting doll, to generate a template composite image of the New Year's painting doll.

In S305, the head of the New Year's painting doll is cut out from the template composite image of the New Year's painting doll, to obtain a head image of the New Year's painting doll together with a background image of the New Year's painting doll without the head image. S306 and S307 are then performed respectively.

In S306, the rotated head images of the New Year's painting doll for respective timestamps are generated by taking a chin feature point as a swing center, based on a trigonometric function motion curve. S308 is then performed.

In S307, the general background image of the New Year's painting doll is superposed on a general background image, to obtain the background image of the New Year's painting doll with the background complemented. S308 is then performed.

In S308, the rotated head images of the New Year's painting doll for respective timestamps are each superposed with the background image of the New Year's painting doll with the background complemented, in a way that a chin feature point in the head image of the New Year's painting doll is located at the position of chin feature point in the background image of the New Year's painting doll with the background complemented. The position of chin feature point is the position of the chin feature point in the template composite image of the New Year's painting doll. Thus, image frames corresponding to respective timestamps are generated, and thus a video of New Year's painting doll with the head of the New Year's painting doll swinging is generated and displayed based on the image frames corresponding to respective timestamps.

Figure 5:
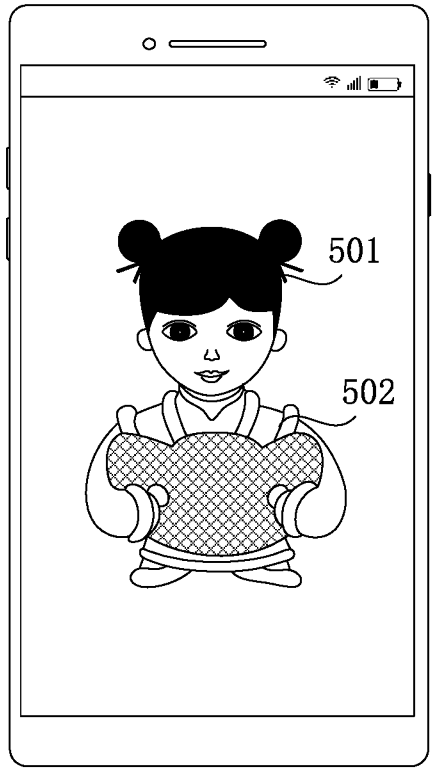
FIG. 5 is a schematic diagram showing a video display interface according to an embodiment of the present disclosure.
Figure 6:
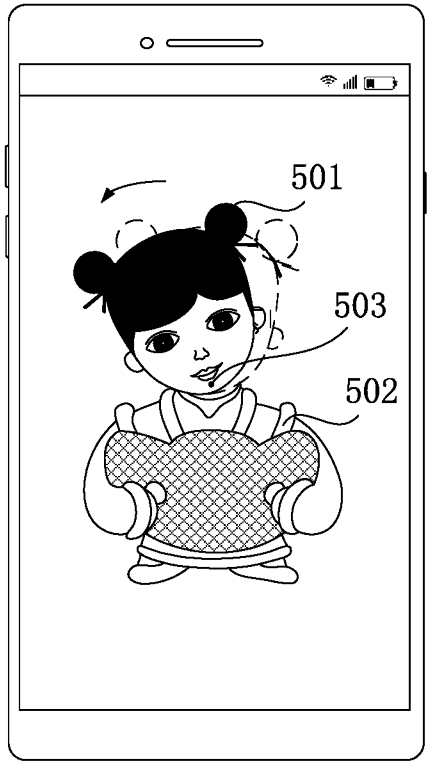
FIG. 6 is a schematic diagram showing a video display interface according to another embodiment of the present disclosure.
Figure 7:
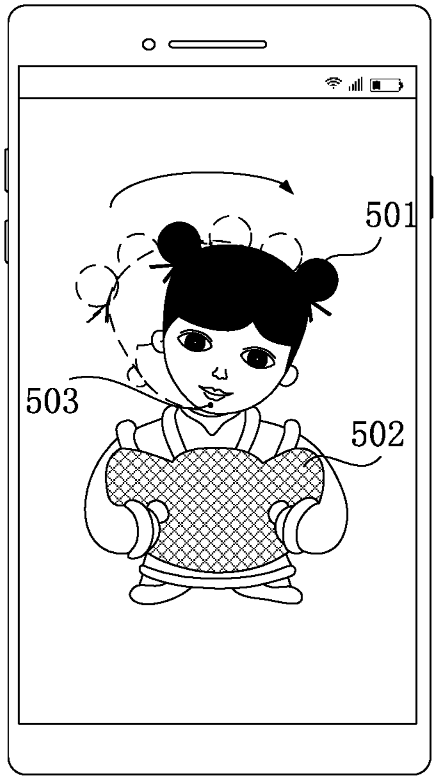
FIG. 7 is a schematic diagram showing a video display interface according to still another embodiment of the present disclosure.

FIG. 5 shows a schematic diagram of a video display interface according to an embodiment of the present disclosure. FIG. 6 shows a schematic diagram of another video display interface according to an embodiment of the present disclosure. FIG. 7 shows a schematic diagram of still another video display interface according to an embodiment of the disclosure.

As shown in FIG. 5, the electronic device may display a first image frame of the video of the New Year's painting doll with the head 501 of the New Year's painting doll swinging. In the first image frame, the head 501 of the New Year's painting doll has an initial swing angle, such as at 0° with respect to a centerline of the body 502 of the New Year's painting doll.

As shown in FIG. 6, in the video of the New Year's painting doll, the head 501 of the New Year's painting doll first swings left to the maximum swing angle by taking a chin feature point 503 as a swing center, with the body 502 of the New Year's painting doll remaining still.

As shown in FIG. 7, in the video of the New Year's painting doll, after the head 501 of the New Year's painting doll swings left to the maximum swing angle, the head 501 of the New Year's painting doll may swing right to the maximum swing angle by taking the chin feature point 503 as the swing center, with the body 502 of the New Year's painting doll remaining still.

In this way, by repeating the swing in FIGS. 6 and 7, the head 501 of the New Year's painting doll may swing back and forth.

To sum up, the electronic device may automatically generate the video of the New Year's painting doll with its head swinging by using any face image inputted by the user, without manually editing the material and editing the video by the user, improving the quality of the video works and improving the user experience.

A video generation apparatus capable of implementing the above video generation method is also provided in the embodiment of the present disclosure. The video generation apparatus according to the embodiment of the present disclosure will be described below with reference to FIG. 8.

In some embodiments of the present disclosure, the video generation apparatus may be an electronic device. The electronic device may include a device with communication function such as a mobile phone, a tablet computer, a desktop computer, a notebook computer, an in-vehicle terminal, a wearable electronic device, an all-in-one machine, and a smart home device, and may also be a device simulated with a virtual machine or an emulator.

Figure 8:
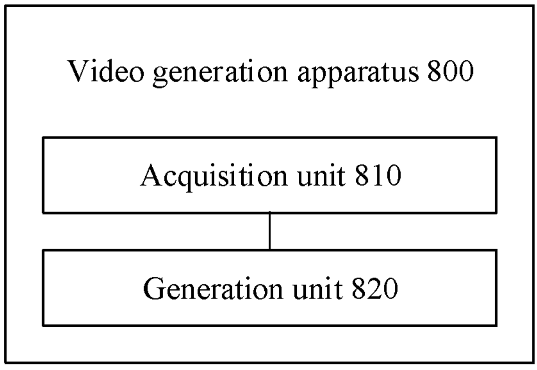
FIG. 8 is a structural diagram of a video generation apparatus according to an embodiment of the present disclosure.

FIG. 8 shows a structural diagram of a video generation apparatus according to an embodiment of the present disclosure.

As shown in FIG. 8, the video generation apparatus 800 may include an acquisition unit 810 and a generation unit 820.

The acquisition unit 810 may be configured to acquire an image of a target object.

The generation unit 820 may be configured to generate a target video based on the image of the target object, where the target video is a video including a swinging target part, and the target part is a part of the target object.

In the embodiment of the present disclosure, after acquiring the image of the target object, the target video including the swinging target part may be directly generated, where the target part is a part of the target object. Therefore, the material editing and video editing are automatically performed, so as to automatically generate the target video including the swinging target part using the image of the target part, without manual material editing and video editing by users, thereby reducing the time cost of video production, improving the quality of video works, to improving the user experience.

In some embodiments of the present disclosure, the generation unit 820 may be configured with a first processing unit and a second processing unit.

The first processing unit may be configured to acquire an image of the target part based on the image of the target object.

The second processing unit may be configured to generate a target video based on the image of the target part.

In some embodiments of the present disclosure, the second processing unit may include a first processing subunit and a second processing subunit.

The first processing subunit may be configured to fuse the image of the target part with a style image of the target part to obtain a fused image of the target part.

The second processing subunit may be configured to generate the target video based on the fused image of the target part.

In some embodiments of the present disclosure, the second processing subunit may be further configured to deform the fused image of the target part to obtain the deformed fused image of the target part, and generate the target video based on the deformed fused image of the target part.

In some embodiments of the present disclosure, the second processing subunit may be further configured to synthesize the fused image of the target part with a style image of a target body-part to obtain a target composite image, and generate the target video based on the target composite image.

In some embodiments of the present disclosure, in the target video, the target part may have a swing angle corresponding to a respective timestamp of the target video. The swing angle may be determined based on the timestamp and a trigonometric function motion curve. The trigonometric function motion curve may be generated based on preset swing parameters. The swing parameters may include a swing direction, a maximum swing angle in the swing direction, and a swing speed in the swing direction.

In some embodiments of the present disclosure, the video generation apparatus 800 may further include a third processing unit and a fourth processing unit.

The third processing unit may be configured to generate the trigonometric function motion curve based on the swing parameters.

The fourth processing unit may be configured to determine the swing angles corresponding to respective timestamps based on the trigonometric function motion curve.

In some embodiments of the present disclosure, the second processing unit may include a third processing subunit and a fourth processing subunit.

The third processing subunit may be configured to rotate the image of the target part at the swing angles corresponding to respective timestamps to obtain rotated images of the target part corresponding to respective timestamps.

The fourth processing subunit may be configured to generate the target video based on the rotated images of the target part corresponding to respective timestamps.

In some embodiments of the present disclosure, the third processing subunit may be further configured to, for each swing angle, acquire a rotation matrix corresponding to the swing angle; and perform image conversion on the image of the target part based on the rotation matrix corresponding to the swing angle by taking a target pixel of the image of the target part as an image origin, to obtain the rotated image of the target part corresponding to the timestamp for the swing angle.

In some embodiments of the present disclosure, the fourth processing subunit may be further configured to superimpose the rotated images of the target part onto a target background image to obtain image frames corresponding to respective timestamps, where the target pixel of each rotated image of the target part is at a target pixel position in the target background image; and generate the target video based on the image frames and the respective timestamps.

It should be noted that the video generation apparatus 800 shown in FIG. 8 may perform each of steps in the method embodiments shown in FIGS. 1 to 7, to implement each process and effect in the method embodiments shown in FIGS. 1 to 7, which is not repeated here.

A video generation device is also provided in the embodiment of the present disclosure. The video generation device may include a processor and a memory for storing executable instructions. The processor may be used to read executable instructions from the memory and execute the executable instructions to perform the video generation method in the above embodiments.

Figure 9:
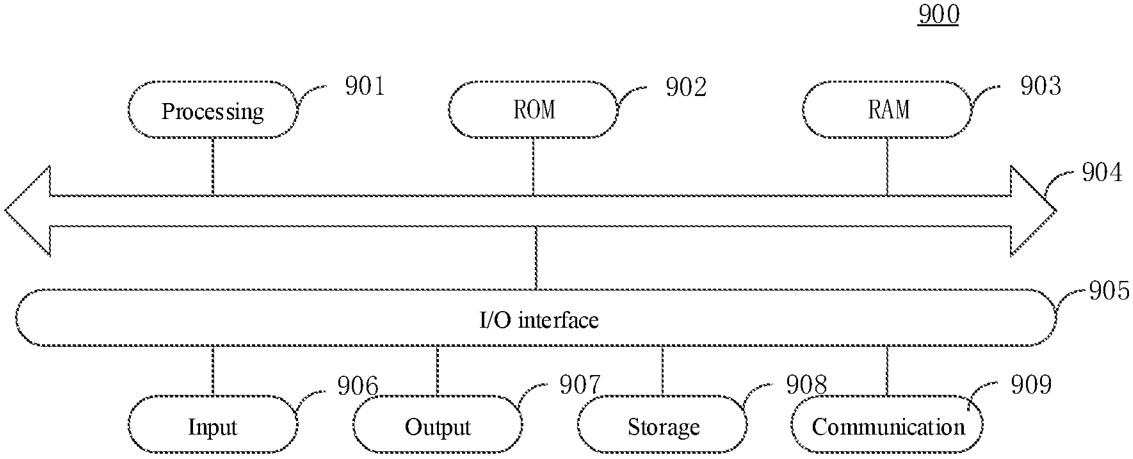
FIG. 9 is a structural diagram of a video generation device according to an embodiment of the disclosure.

FIG. 9 shows a structural diagram of a video generation device according to an embodiment of the present disclosure. Reference is made to FIG. 9. FIG. 9 shows a structural diagram of a video generation device 900 suitable for implementing the embodiment of the present disclosure.

The video generation device 900 in the embodiment of the present disclosure may be an electronic device. The electronic device may include, but is not limited to, a mobile phone, a laptop, a digital broadcast receiver, a PDA (personal digital assistant), a PAD (a tablet computer), a PMP (a portable multimedia player), a vehicle-mounted terminal (such as an in-vehicle navigation terminal), a wearable device and other mobile terminals and a fixed terminal such as a digital TV, a desktop computer, a smart home device etc.

It should be noted that the video generation device 900 shown in FIG. 9 is only an example and should not indicate any limitation to the function and application scope of the embodiments of the present disclosure.

As shown in FIG. 9, the electronic device 900 may include a processing apparatus 901, such as a central processor or a graphics processor, which may execute various proper operations and processing based on a program stored in a Read Only Memory (ROM) 902 or a program loaded from a storage apparatus 908 into a Random Access Memory (RAM) 903. Various programs and data are stored in the RAM 903, which are required by the video generation device 900 to perform an operation. The processing apparatus 901, the ROM 902 and the RAM 903 are connected to each other through a bus 904. An Input/output (I/O) interface 905 is also connected to the bus 904.

Generally, the I/O interface 905 may be connected to: an input apparatus 906, such as a touch screen, a touch panel, a keyboard, a mouse, a camera, a microphone, an accelerometer, and a gyroscope; an output apparatus 907, such as a liquid crystal display (LCD), a speaker, and a vibrator; a storage apparatus 908 such as a magnetic tape and a hard disk; and a communication apparatus 909. The communication apparatus 909 may enable wireless or wired communication between the video generation device 900 and other devices for data exchanging. Although FIG. 9 shows the video generation device 900 having various apparatuses, it should be understood that the illustrated apparatuses are not necessarily required to all be implemented or embodied. Alternatively, more or fewer apparatuses may be implemented or included.

A computer-readable storage medium storing a computer program thereon is also provided in the embodiment of the present disclosure. The computer program, when executed by the processor, causes the processor to perform the video generation method in the above embodiment.

Particularly, according to the embodiment of the present disclosure, the process described above in conjunction with flowcharts may be implemented as a computer software program.

A computer program product is also provided in the embodiment of the present disclosure. The computer program product may include a computer program. The computer program, when executed by a processor, causes the processor to perform the video generation method in the above embodiment.

For example, a computer program product is further provided as an embodiment in the present disclosure, including a computer program carried on a non-transitory computer readable medium. The computer program includes program code for performing the method shown in the flowchart. In the embodiment, the computer program may be downloaded and installed from the network via the communication apparatus 909, or installed from the storage apparatus 908, or installed from the ROM 902. When the computer program is executed by the processing apparatus 901, the functions defined in the video generation method according to the embodiment of the present disclosure are performed.

It should be noted that, the computer readable medium mentioned in the present disclosure may be a computer readable signal medium or a computer readable storage medium or any combination thereof. The computer readable storage medium may be but is not limited to, a system, an apparatus, or a device in an electronic, magnetic, optical, electromagnetic, infrared, or semi-conductive form, or any combination thereof. Specific examples of the computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In the embodiment of the present disclosure, the computer readable storage medium may be any tangible medium containing or storing a program, and the program may be used by or in combination with an instruction execution system, apparatus, or device. In the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and can send, propagate or transmit programs to be used by or in combination with an instruction execution system, apparatus or device. The program codes stored in the computer readable medium may be transmitted via any proper medium including but not limited to: a wire, an optical cable, RF (radio frequency) and the like, or any proper combination thereof.

In some embodiments, the client and the server may communicate using any currently known or future developed network protocol such as HTTP, and may be interconnected with any form or medium of digital data communication (e.g., a communication network). Examples of a communication network include a local area network ("LAN"), a wide area network ("WAN"), the Internet Work (for example, the Internet), and a peer-to-peer network (for example, an ad hoc peer-to-peer network), as well as any currently known network or a future developed network.

The computer readable medium may be incorporated in the video generation device above, or may exist alone without being assembled into the video generation device.

The computer-readable medium carries one or more programs. The one or more programs, when executed by the video generation device, cause the video generation device to:

acquire an image of a target object; generate a target video based on the image of the target object, where the target video is a video including a swinging target part, and the target part is a part of the target object.

In the embodiment of the present disclosure, the computer program code for performing the operations disclosed in the present disclosure may be written in one or more programming languages or combinations thereof. The programming languages include but are not limited to an object-oriented programming language, such as Java, Smalltalk, and C++, and a conventional procedural programming language, such as C language or a similar programming language. The program code may be executed entirely on a user computer, partially on the user computer, as an independent software package, partially on the user computer and partially on a remote computer, or entirely on the remote computer or a server. In a case involving a remote computer, the remote computer may be connected to a user computer or an external computer through any kind of network including local area network (LAN) or wide area network (WAN). For example, the remote computer may be connected through Internet connection by an Internet service provider.

Flow charts and block charts in the drawings illustrate the architecture, functions and operations that can be implemented by the system, method and computer program product according to the embodiments of the present disclosure. In this regard, each block in the flowchart or the block diagram may represent a module, a program segment, or a part of code. The module, the program segment, or the part of code includes one or more executable instructions used for implementing specified logic functions. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each of the block in the block diagram and/or flowchart and a combination of the blocks in the block diagram and/or flowchart may be implemented by a dedicated hardware-based system that performs specified functions or actions, or may be realized by a combination of dedicated hardware and computer instructions.

The units mentioned in the description of the embodiments of the present disclosure may be implemented by means of software, or otherwise by means of hardware. In some circumstances, name of a unit does not constitute a limitation on the unit itself.

The functions described herein above may be performed, at least in part, by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and the like.

In the context of the present disclosure, the machine readable medium may be a tangible medium that may contain or store a program, and the program may be used by or in connection with an instruction execution system, apparatus or device. The machine readable medium may be a machine readable signal medium or a machine readable storage medium. The computer readable medium may include, but is not limited to, system, an apparatus, or a device in an electronic, magnetic, optical, electromagnetic, infrared, or semi-conductive form, or any suitable combination thereof. More specific examples of the machine readable storage medium may include, one or more wire based electrical connections, a portable computer disk, a hard disk, a random access memory (RAM), a read-only memory (ROM), an erasable programmable read-only memory (EPROM or Fast flash memory), an optical fiber, a portable compact disc read-only memory (CD-ROM), an optical storage device, a magnetic storage device or any suitable combination thereof.

The above description includes merely preferred embodiments of the present disclosure and explanations of technical principles used. Those skilled in the art should understand that the scope of the present disclosure is not limited to the technical solution formed by combination of the technical features described above, but also covers other technical solutions formed by any combination of the above technical features or the equivalent features of the technical features without departing from the concept of the present disclosure. For example, a technical solution formed by interchanging the above features and technical features having similar functions as disclosed, but not limited to, in the present disclosure with each other is also covered with the scope of the present disclosure.

Furthermore, although the above operations are described in a specific order, it should not be understood that these operations are required to be performed in the specific order or performed in a sequential order. Under certain circumstances, multitasking and parallel processing may be advantageous. Although multiple implementation details are included in the above descriptions, the details should not be interpreted as limitations to the scope of the present disclosure. The features described in separate embodiments may be implemented in combination in a separate embodiment. Conversely, the features described in a separate embodiment may be implemented in multiple embodiments individually or in any suitable sub-combination.

Although the subject matter has been described in language specific to structural features and/or logical actions of the method, it should be understood that the subject matter defined in the appended claims are unnecessarily limited to the specific features or actions described above. The specific features and actions described above are merely exemplary forms of implementing the claims.

The invention claimed is:

1. A video generation method, comprising:

acquiring an image of a target object; and generating a target video based on the image of the target object, comprising acquiring an image of a target part based on the image of the target object and generating the target video based on the image of the target part, wherein the target part swings in the target video, and the target part is a part of the target object, wherein generating the target video based on the image of the target object comprises:

fusing the image of the target part and a style image of the target part to obtain the fused image of the target part; and generating the target video based on the fused image of the target part, wherein in the target video, the target part has a swing angle corresponding to a respective timestamp of the target video, the swing angle is determined based on the timestamp and a trigonometric function motion curve, the trigonometric function motion curve is generated based on preset swing parameters, and the swing parameters comprise a swing direction, a maximum swing angle in the swing direction and a swing speed in the swing direction.

2. The method according to claim 1, wherein generating the target video based on the fused image of the target part comprises:

deforming the fused image of the target part to obtain a deformed fused image of the target part; and generating the target video based on the deformed fused image of the target part.

3. The method according to claim 1, wherein before generating the target video based on the image of the target object, the method further comprises:

generating the trigonometric function motion curve based on the swing parameters; and determining swing angles corresponding to respective timestamps based on the trigonometric function motion curve.

4. The method according to claim 1, wherein generating the target video based on the image of the target part comprises:

rotating the image of the target part at the swing angles corresponding to respective timestamps to obtain rotated images of the target part corresponding to respective timestamps; and generating the target video based on the rotated images of the target part corresponding to respective timestamps.

5. The method according to claim 4, wherein rotating the image of the target part at the swing angles corresponding to respective timestamps to obtain rotated images of the target part corresponding to respective timestamps comprises:

for each swing angle, acquiring a rotation matrix corresponding to the swing angle; and performing image conversion on the image of the target part based on the rotation matrix corresponding to the swing angle by taking a target pixel of the image of the target part as an image origin, to obtain the rotated image of the target part corresponding to the timestamp for the swing angle.

6. The method according to claim 5, wherein generating the target video based on the rotated images of the target part corresponding to respective timestamps comprises:

superposing the rotated images of the target part onto a target background image to obtain image frames corresponding to respective timestamps, wherein the target pixel of each rotated image of the target part is at a target pixel position in the target background image; and generating the target video based on the image frames and the respective timestamps corresponding to the image frames.

7. The method according to claim 1, wherein generating the target video based on the fused image of the target part comprises:

synthesizing the fused image of the target part and a style image of other parts of the target object except the target part, to obtain a target composite image; and generating the target video based on the target composite image.

8. A video generation device, comprising:

a processor;

a memory for storing executable instructions;

wherein, the processor is configured to read the executable instructions from the memory and execute the executable instructions to perform:

acquiring an image of a target object; and generating a target video based on the image of the target object, comprising acquiring an image of a target part based on the image of the target object and generating the target video based on the image of the target part, wherein the target part swings in the target video, and the target part is a part of the target object, wherein the processor is configured to read the executable instructions from the memory and execute the executable instructions to perform:

fusing the image of the target part and a style image of the target part to obtain the fused image of the target part; and generating the target video based on the fused image of the target part, wherein in the target video, the target part has a swing angle corresponding to a respective timestamp of the target video, the swing angle is determined based on the timestamp and a trigonometric function motion curve, the trigonometric function motion curve is generated based on preset swing parameters, and the swing parameters comprise a swing direction, a maximum swing angle in the swing direction and a swing speed in the swing direction.

9. The device according to claim 8, wherein the processor is further configured to perform:

deforming the fused image of the target part to obtain a deformed fused image of the target part; and generating the target video based on the deformed fused image of the target part.

10. The device according to claim 8, wherein the processor is further configured to perform:

generating the trigonometric function motion curve based on the swing parameters; and determining swing angles corresponding to respective timestamps based on the trigonometric function motion curve.

11. The device according to claim 8, wherein the processor is further configured to perform:

rotating the image of the target part at the swing angles corresponding to respective timestamps to obtain rotated images of the target part corresponding to respective timestamps; and generating the target video based on the rotated images of the target part corresponding to respective timestamps.

12. The device according to claim 11, wherein the processor is further configured to perform:

for each swing angle, acquiring a rotation matrix corresponding to the swing angle; and performing image conversion on the image of the target part based on the rotation matrix corresponding to the swing angle by taking a target pixel of the image of the target part as an image origin, to obtain the rotated image of the target part corresponding to the timestamp for the swing angle.

13. The device according to claim 8, wherein the processor is further configured to perform:

synthesizing the fused image of the target part and a style image of other parts of the target object except the target part, to obtain a target composite image; and generating the target video based on the target composite image.

14. A non-transitory computer-readable storage medium storing a computer program thereon, wherein the computer program, when being executed by a processor, causes the processor to perform:

acquiring an image of a target object; and generating a target video based on the image of the target object, comprising acquiring an image of a target part based on the image of the target object and generating the target video based on the image of the target part, wherein the target part swings in the target video, and the target part is a part of the target object, wherein the computer program, when being executed by a processor, causes the processor to perform:

fusing an image of the target part and a style image of the target part to obtain the fused image of the target part; and generating the target video based on the fused image of the target part, wherein in the target video, the target part has a swing angle corresponding to a respective timestamp of the target video, the swing angle is determined based on the timestamp and a trigonometric function motion curve, the trigonometric function motion curve is generated based on preset swing parameters, and the swing parameters comprise a swing direction, a maximum swing angle in the swing direction and a swing speed in the swing direction.

* * * * *